United States Patent [19]

Schiffman et al.

[11] 4,002,855
[45] Jan. 11, 1977

[54] PUSH-BUTTON TELEPHONE ATTACHMENT

[76] Inventors: Jerome D. Schiffman, 116 Woodbine, Wilmette, Ill. 60091; Bernard L. Kleinke, 934 Willson Drive, Des Plaines, Ill. 60016

[22] Filed: Sept. 24, 1974

[21] Appl. No.: 508,768

[52] U.S. Cl. .............................. 179/90 K; 179/178
[51] Int. Cl.² ......................................... H04M 1/23
[58] Field of Search .......... 179/90 K, 90 R, 90 AT, 179/81 R; 200/340, 159 R, 5 E, 178, 333, 340, 302, 304; 40/336; 197/102

[56] References Cited

UNITED STATES PATENTS

| | | | |
|---|---|---|---|
| 3,739,105 | 6/1973 | Anson | 179/90 K |
| 3,778,553 | 12/1973 | Rackman | 179/90 K |
| 3,866,000 | 2/1975 | Gillis | 179/189 D |
| 3,927,282 | 12/1975 | Firstenberg | 179/90 A |

*Primary Examiner*—Kathleen H. Claffy
*Assistant Examiner*—Gerald L. Brigance
*Attorney, Agent, or Firm*—Bernard L. Kleinke

[57] ABSTRACT

An attachment adapted to be used with a push-button telephone having an array of telephone push buttons for facilitating the actuation of them, includes a series of finger discs corresponding to at least some of the telephone push buttons and bearing indicia on their upper faces, and a series of links fixedly connected to the lower faces of the discs extending to the telephone push buttons through apertures in a cup-shaped housing adapted to fit over the array of telephone push buttons which can be actuated by depressing the finger dics. At least some of the links are in the form of legs having an intermediate offset portion so that the upper faces of the discs may be larger in size and spaced further apart than the corresponding telephone push buttons to facilitate ready location of and manipulation of the finger discs.

10 Claims, 6 Drawing Figures

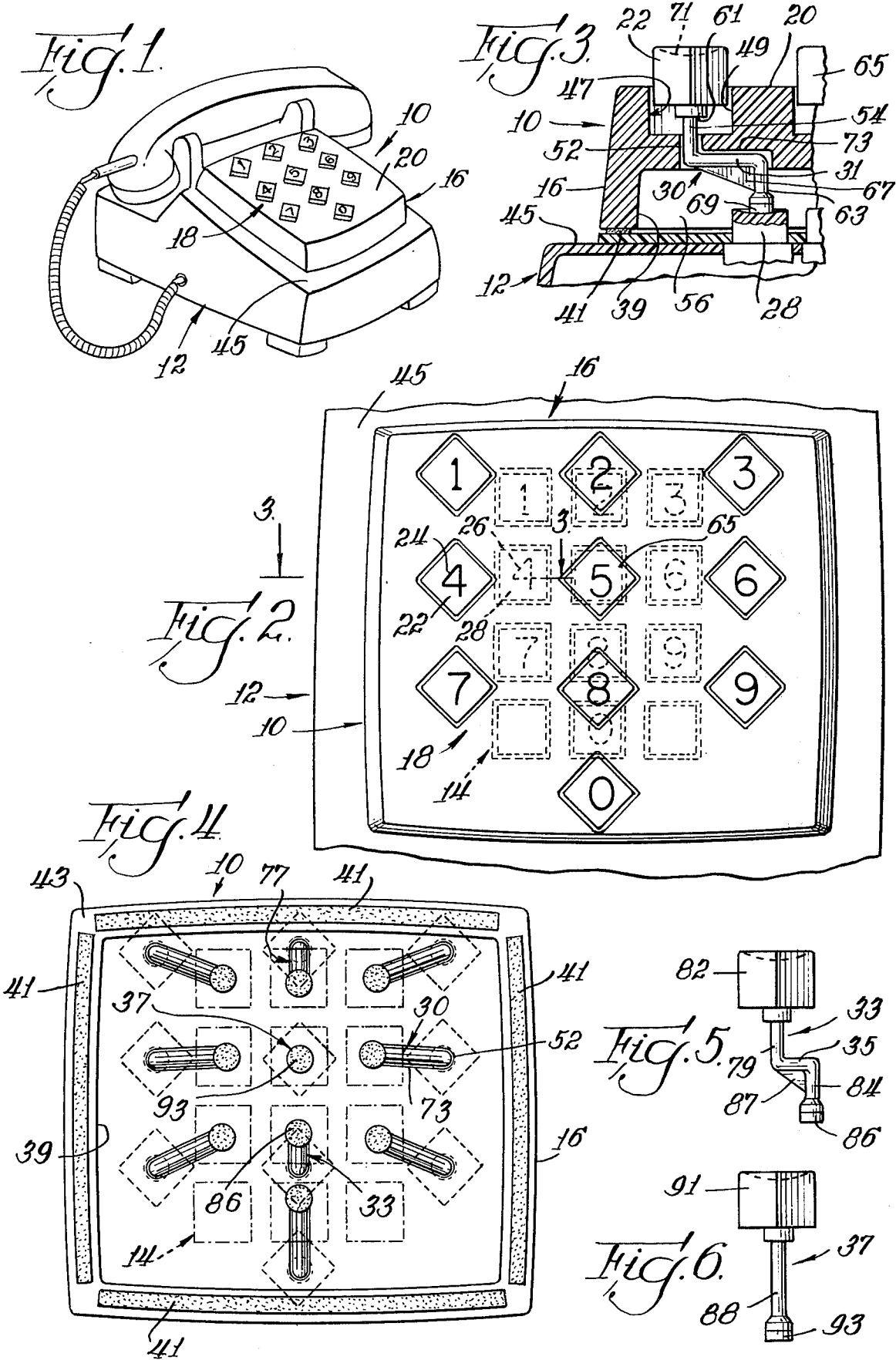

PUSH-BUTTON TELEPHONE ATTACHMENT

The present invention relates in general to an attachment for a push-button telephone, and it more particularly relates to such an attachment which facilitates the location and manipulation of the telephone push buttons.

Telephones employing multifrequency signaling have employed an array of closely spaced push buttons. While such an arrangement has been satisfactory for some applications, the close spacing between the buttons and the small indicia on the face of the buttons have caused a problem in seeing the indicia and locating the desired buttons. As a result, mistakes have been made inadvertently in initiating the calls by pressing the wrong push button. Also, the close spacing requires some manual dexterity, and thus accidental actuation of unintended push buttons has occurred.

In an attempt to overcome these problems, an index for a push-button telephone has been suggested as indicated in US. Pat. No. 3,739,104. The patented index includes a housing for fitting over the telephone push-buttons so that tabs slidably mounted thereon and fixed directly to the corresponding ones of the telephone push buttons facilitate the operation of the telephone push buttons in that the tabs are substantially larger in size than the corresponding push buttons. However, the larger size tabs are arranged such that they are closer together than the telephone push buttons. As a result, the tabs do not overcome the problem of the overcrowded arrangement of the telephone push buttons, since the user may very well actuate the wrong push button unintentionally. Also, the patented index is somewhat expensive to manufacture, even though it is intended to be composed of plastic material, since the tabs must be mounted within the housing in an assembly procedure which would be unduly expensive.

Therefore, the principal object of the present invention is to provide a new and improved attachment for push-button telephones to facilitate the location and manipulation of the telephone push buttons to greatly reduce the chance of inadvertently actuating wrong telephone push buttons, such an attachment being inexpensive to manufacture and aesthetically pleasing in appearance to serve as a decorative item.

Briefly, the above and further objects of the present invention are realized by providing an attachment including a series of finger discs corresponding to at least some of the telephone push buttons and bearing indicia on their front faces, and a series of links or legs fixedly connected to the rear faces of the discs and slidably extending through apertures in a cup-shaped housing adapted to fit over an array of telephone push buttons which can be actuated by depressing the larger and more greatly spaced apart discs. At least some of the links or legs have an intermediate transversely offset portion so that the front faces of the discs may be larger in size and spaced further apart than the corresponding telephone push buttons to facilitate ready location of and manipulation of the finger discs.

The above and further objects will best be understood by reference to the accompanying description and the drawings, wherein:

FIG. 1 is a pictorial view of the attachment mounted on a conventional push-button telephone, the attachment being constructed in accordance with the present invention;

FIG. 2 is an enlarged top plan view of the attachment of FIG. 1;

FIG. 3 is a cross-sectional view of the attachment of FIG. 2 taken substantially along the line 3—3 thereof;

FIG. 4 is a bottom enlarged plan view of the attachment of FIG. 1, showing the attachment apart from a telephone;

FIG. 5 is an elevational view of one of the links or legs of the attachment of FIG. 2, showing it removed from the attachment;

FIG. 6 is an elevational view of another one of the legs or links of the attachment of FIG. 2, showing the leg or link removed from the attachment.

Referring now to the drawings, and more particularly to FIG. 1 thereof, there is shown an attachment 10, which is constructed in accordance with the principles of the present invention, and which is mounted on a telephone 12 having an array of push buttons 14 (shown in broken lines in FIG. 2). The attachment 10 generally comprises a cup-shaped housing 16 having an array of finger discs generally indicated at 18 projecting from a plate 20 of the housing 16. The array of finger discs 18 are slidably mounted on the housing 16 and are adapted to actuate corresponding ones of the array 14 of the push buttons for the telephone 12. The finger discs of the array 18 are arranged in rows and columns, and the discs in a given row are arranged further apart than the telephone push buttons of the array 14 to greatly facilitate accurate manipulation of the array of push buttons 18, whereby the chances of actuating wrong telephone push buttons of the array 14 is greatly reduced. Moreover, the finger discs of the array 18 are somewhat larger in size than the corresponding telephone push buttons of the array 14 so as to greatly facilitate the actuation of the corresponding array of telephone push buttons. Moreover, the finger discs are somewhat larger in size than the corresponding telephone push buttons so that as best seen in FIG. 2, the finger discs, such as the disc 22, bear on their front faces large numerical indicia, such as the numerical indicia 24 on the front face of the finger disc 22, whereby the user can more readily see the numerical indicia of the array 18 as compared to the numerical indicia, such as the indicia 26 on the front face of the button 28. As best seen in FIGS. 3 and 5 of the drawings, a series of links or legs, such as the leg 30 (FIG. 3), interconnect the finger discs with corresponding ones of the telephone push buttons, such as the interconnection by the leg 30 between the finger disc 22 and the corresponding telephone push button 28. Some of the legs, such as the leg 30, include a transversely extending offset portion 31 to enable the finger discs to be spaced further apart in a row as compared to the telephone push buttons. The attachment 10 includes only three different kinds of legs, such as the leg 30 of FIG. 3, the leg 33 of FIG. 5 having a relatively shorter transversely extending offset portion 35, and a leg 37 having no intermediate offset portion. As a result, with only three different kinds of legs, if it is desired to mold the attachment 10 of plastic material, the mold would be simplified and inventory and storage considerations for the parts are greatly simplified as compared to having a different leg for each different finger disc.

Considering now the attachment 10 in greater detail with reference to the drawings, the housing 16 as shown in FIG. 4 includes an opened mouth 39 for fitting over the array 14 of telephone push buttons, and a series of pressure-sensitive adhesive strips 41 extend along the rim 43 on the backside of the housing 16 as shown in FIG. 4 so that the housing 16 can be secured to the inclined face 45 of the telephone 12. A series or array of apertures, such as the aperture 37 of FIG. 3, extend through the plate or wall 20 of the housing 16 to slidably mount the legs therewithin.

Since each one of the apertures or holes of the array 18 is generally similar to one another, only the aperture 47 will now be described in detail. The aperture 47 includes an enlarged forward portion 49 in the upper surface of the plate 20 for receiving its finger disc 22, and a reduced diameter portion 52 for reciprocatively receiving the forward portion 54 of its leg 30, the reduced diameter portion 52 opening at its rear end into a chamber 56 which receives the array 14 of telephone push buttons, such as the button 28. In order to prevent the leg 30 from rotating axially, the disc 22 is not circular in cross-section and the cross-sectional shape of the enlarged portion 49 of the aperture 47 is complementary-shaped relative to the shape of the disc 22. In this regard, as best seen in FIG. 2 of the drawings, the finger discs and their apertures receiving them are both diamond-shaped to prevent axial rotation of the legs. While a diamond shape is shown and described herein, it is to be understood that other non-circular shapes may also be employed, such shapes as square, oval, and others. It should be understood further that if a circular shape is desired, crowns (not shown) of circular cross-sectional shape may be fixed in any convenient manner over the portions of the discs normally extending above the upper surface of the plate 20. As shown in FIG. 2, the finger discs are arranged in a series of rows and columns to form the array 18 which is similar in arrangement to the corresponding array 14 of telephone push buttons, only ten of the twelve telephone push buttons are actuated by the attachment 10, it being understood that a greater or fewer number of finger discs may be employed on the attachment 10 to actuate a fewer or greater number of telephone push buttons if desired.

Considering now the legs or links in greater detail, there are six legs connected to the two outer columns of three finger discs, with each one of the six legs being substantially identical to one another. The leg for the bottom finger disc of the attachment is also substantially identical to the six outer legs. Therefore, only the leg 30 will now be described in greater detail with reference to FIGS. 3 and 4 of the drawings. The leg 30 generally comprises the forward portion 54 axially aligned with the enlarged portion 49 and the reduced portion 52 of the aperture 47 and press fitted into an opening in the backside of the finger disc 22 in a boss 61 for fixedly connecting the finger disc 22 to the forward end of the portion 54 of the leg 30, and the laterally offset intermediate portion 31 extends at right angles to the forward portion 54 and terminates in a foot portion 63 adapted to engage the telephone push button 28, the foot portion 63 being displaced laterally from the front portion 54 by a substantial distance to enable the finger disc 22 to be spaced further apart from the adjacent finger disc 65. A triangular-shaped stiffening web 67 is integrally connected and disposed to the rear of the intermediate portion 31 and the foot portion 63. A resilient pad 69 is secured by any suitable means, such as adhesive, to the rear end portion of the foot portion 63 to engage and grip the recessed upper portion of the telephone push button 28.

In order to facilitate the manipulation of the finger discs, each one of the finger discs, such as the finger disc 22 of FIG. 3, includes an upper recess 71 as indicated in broken lines to enable the finger of the user to engage securely for depressing it. When the user presses the finger discs downwardly, the legs attached thereto also move downwardly to depress the selected telephone push buttons. The return springs (not shown) for the telephone push buttons cause the legs of the attachment 10 to return to their initial positions as shown in FIG. 3 so that no return springs are needed for the attachment 10.

The attachment 10 is preferably composed of plastic material. In order to facilitate the assembly of the attachment 10, as shown in FIGS. 3 and 4 of the drawings, a plurality of orienting grooves, such as the groove 73 for the leg 30, are disposed in the backside of the plate 20 opening into the chamber 56 for receiving the intermediate portions of the legs, whereby when the attachment 10 is being assembled, the legs with the discs removed are inserted into the apertures with the intermediate portions aligned with and positioned within the orientation grooves so that when the discs are later snapped onto the forward end portions of the legs to thereafter prevent any axial rotation thereof, the legs are then in the proper position to mate with the corresponding ones of the telephone push buttons.

A pair of legs 33 and 77 (FIG. 4) of the middle column have shorter intermediate leg portions. Since the legs 33 and 77 are similar to one another, it will only be necessary to describe the leg 33. As shown in FIG. 5, the leg 33 includes a forward portion 79 having a finger disc 82 press fitted onto its forward end in a similar manner as the finger disc 22 on the leg 30, and the intermediate offset portion 35 integrally connects the forward portion 79 to a foot portion 84, which terminates in an integrally connected resilient pad 86. The intermediate portion 35 is somewhat shorter in length than the longer intermediate portions, such as the intermediate portion 31 of the leg 30 due to the orientation of the finger discs relative to the corresponding telephone push buttons. A triangular-shaped stiffening web 87 joins the intermediate portion 35 and the foot portion 84.

As shown in FIG. 6, the leg 37 for the middle column of finger discs includes a single axially-extending rod 88 integrally connecting a finger disc 91 at its forward end and a resilient pad 93 at its rear end for actuating its corresponding telephone push button since there is no need for a lateral offset due to the positioning of the telephone push buttons relative to the finger discs. Thus, there are only three different kinds of legs employed by the attachment 10, and hence the mold for manufacturing the plastic attachment 10 is simplified and the inventory control for the various different parts is greatly simplified.

In order to assemble the attachment 10, the legs with the finger discs removed are inserted with their forward ends through the chamber 56 into the apertures and rotated until the intermediate portions are aligned with the orientation grooves. Thereafter, a flat plate (not shown) or other similar fixture may be used to press the foot portions of the legs toward the plate 20 for maintaining the intermediate portions of the legs in their orientation grooves, whereby the finger discs may then be inserted into the enlarged portions of the apertures for snapping the finger discs into engagement with the forward ends of the legs to complete the assembly operation. Thus, the legs are then trapped within the apertures since the finger discs and the pads are larger in diameter than the reduced diameter portions of the apertures. Also, as mentioned before, the shape of the discs and the complementary shape of their enlarged portions of the apertures prevent axial rotation of the legs. As a result, the attachment can be readily secured in place on the telephone 12 with the pads in proper position in engagement with the telephone push buttons.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. An attachment adapted to be used with a push button telephone having an array of telephone push buttons, said attachment comprising:
    a cup-shaped housing having an opened mouth adapted to fit over the array of push buttons of the telephone and to be secured in place thereover, said housing having a plate, said plate including an array of apertures extending therethrough, said plate having inner and outer faces;
    an array of finger discs corresponding to at least some of the telephone push buttons for actuating them and bearing indicia on the front faces of said discs, said discs normally at least partially extending outwardly from the outer face of said plate, said discs having rear faces on the opposite side of said front faces; and
    a series of elongated legs fixedly connected to said rear faces and slidably extending through said apertures to the telephone push buttons for actuating them selectively when depressed and alternatively maintaining said discs normally at least partially extending outwardly from the outer face of said plate, at least one of said legs having an axially-extending front portion disposed in axial alignment with its aperture in said plate and having a laterally extending intermediate portion connected at its forward end to said front portion and terminating in a foot portion adapted to engage one of the telephone push buttons.

2. An attachment according to claim 1, wherein each one of said apertures includes an enlarged portion for receiving its finger disc and a reduced diameter portion for reciprocatively receiving the forward portion of its leg, the intermediate and foot portions of said legs being disposed in back of said plate.

3. An attachment according to claim 2, wherein the cross-sectional shape of said enlarged portions of said apertures are complementary shaped relative to the cross-sectional shapes of said discs, the complementary cross-sectional shapes of said enlarged portions and said discs causing said discs and said legs fixed thereto to resist axial rotation thereof.

4. An attachment according to claim 3, wherein the rear face of said plate includes means defining a plurality of orientation grooves for each one of said legs having intermediate offset portions to receive them when said discs are withdrawn partially from their enlarged portions of their apertures.

5. An attachment according to claim 3, wherein one of said legs includes longer intermediate portions and shorter laterally offset intermediate portions, further including at least one leg having an axially-extending front portion aligned with its aperture and terminating in its foot portion disposed in axial alignment with its front portion.

6. An attachment according to claim 5, further including a plurality of stiffening webs connected integrally to said legs having said offset intermediate portions thereat.

7. An attachment according to claim 6, wherein said foot portions of said legs each includes resilient pads.

8. An attachment according to claim 1, wherein the rear face of said plate includes means defining a plurality of orientation grooves for each one of said legs having intermediate offset portions to receive them when said discs are withdrawn partially from their enlarged portions of their apertures.

9. An attachment according to claim 1, wherein one of said legs includes longer intermediate portions and shorter laterally offset intermediate portions, further including at least one leg having an axially-extending front portion aligned with its aperture and terminating in its foot portion disposed in axial alignment with its front portion.

10. An attachment according to claim 9, wherein the rear face of said plate includes means defining a plurality of orientation grooves for each one of said legs having intermediate offset portions to receive them when said discs are withdrawn partially from their enlarged portions of their apertures.

* * * * *